March 26, 1957   E. W. HOLMBERG ET AL   2,786,603
APPARATUS FOR MEASURING AND DISPENSING LIQUIDS
Filed July 9, 1953   7 Sheets-Sheet 1

March 26, 1957  E. W. HOLMBERG ET AL  2,786,603
APPARATUS FOR MEASURING AND DISPENSING LIQUIDS
Filed July 9, 1953  7 Sheets-Sheet 7

Inventors
Erland Walter Holmberg,
Lars Per Elias Westlin,
By Pierce, Scheffler + Parker
Attorneys

United States Patent Office 2,786,603
Patented Mar. 26, 1957

2,786,603

APPARATUS FOR MEASURING AND DISPENSING LIQUIDS

Erland Walter Holmberg, Bromma, and Lars Per Elias Westlin, Hoganas, Sweden

Application July 9, 1953, Serial No. 366,999

Claims priority, application Sweden July 17, 1952

7 Claims. (Cl. 222—64)

This invention relates to measuring and dispensing apparatus for liquids of different kinds.

The primary object of the invention is to provide measuring and dispensing apparatus which is adapted automatically to measure and dispense predetermined amounts of a liquid.

A further object of the invention is to provide apparatus for simultaneously measuring and dispensing a number of liquid quantities which can be of different kinds and/or of different sizes between themselves.

A still further object of the invention is to provide means for automatically controlling the operational cycle of such measuring and dispensing apparatus.

Further objects and distinctive features of the invention, and its method of operation will be best understood from the following description of specific embodiments of the invention or parts thereof, reference to the appended drawings being had therein.

Figure 1:
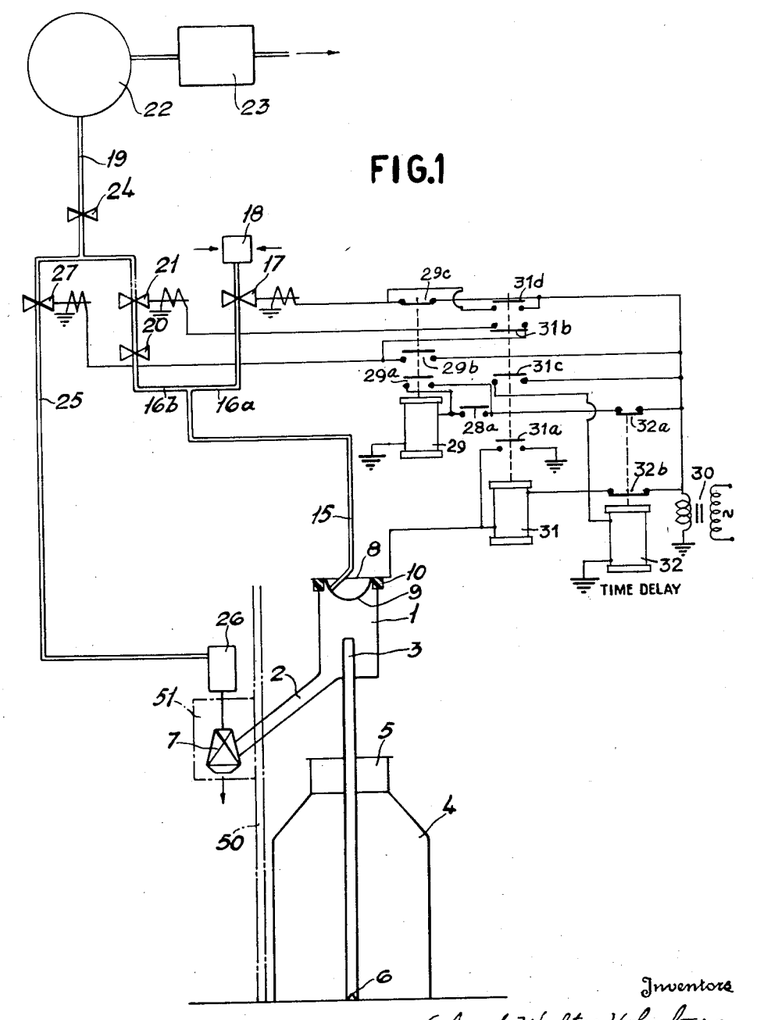
Fig. 1 is a diagrammatic section through a measuring unit connected to an electric circuit which governs the operation of a number of control devices.
Figure 2:
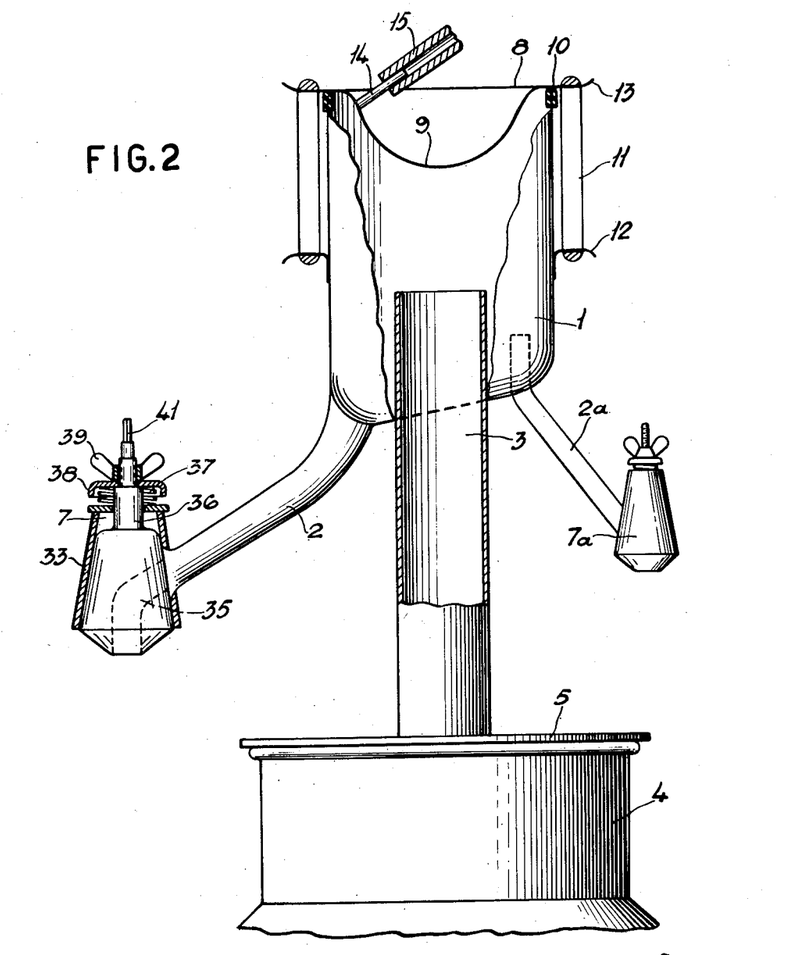
Fig. 2 is a section on a larger scale through the measuring and dispensing unit in Fig. 1.

With reference to Figs. 1 and 2 the measuring and dispensing arrangement comprises a measuring receptacle 1 having an outwardly-downwardly extending outlet pipe 2 and a centrally disposed suction pipe 3 which passes through the bottom of the receptacle 1 and extends up to a certain level within the receptacle. Pipe 3 is extended downwards and is passed through the lid 5 of a container 4 reaching down to the bottom of said container. The bottom edge of pipe 3 advantageously is formed with an undulated or notched edge 6 to prevent choking of the fluid supply from the container 4 to suction pipe 3 by any loose or foreign matter which may have settled at the bottom. At the bottom end of outlet pipe 2 a valve device 7 is provided, the arrangement of which will be more closely described farther on.

At the top of the measuring receptacle 1 a lid 8 is provided which has a downwardly extending member, such as a cup-shaped central portion 9, but which may as well consist of an electrode depending from the lid. The lid 8 is supported by the upper rim of the receptacle 1 with the interposition of electrically insulating, gas- and fluid-tight sealing means 10 such as a rubber ring or the like, and sealing action is further improved by the provision of clamping means such as clip members 11 engaging lugs 12 and 13 extending from the receptacle and the lid respectively (Fig. 2).

To the upper face of lid 8 a pipe union 14 is secured which is connected by means of a pipe 15 to two conduits 16a and 16b. Conduit 16a terminates with an electromagnetically controlled shut-off valve 17 and an air filter 18, and in the other conduit 16b a throttle valve 20 and an electromagnetically controlled valve 21 are provided. Farther on conduit 16b is connected to a pipe 19 from a vacuum vessel 22. The throttle valve 20 is used for controlling the suction action between the vacuum vessel 22 and the receptacle 1. The vessel 22 is connected to a vacuum pump 23 which maintains vacuum in the vessel. In pipe 19 a valve 24 is provided, and to pipe 19 further a pipe 25 is connected, which extends to a control unit 26 for the valve device 7. An electromagnetically controlled valve 27 is disposed in conduit 25. All pipe connections and vessels are effectively sealed against air or liquid leakage, that being a condition for the proper functioning of the arrangements covered by this specification.

The arrangement described above can perform automatically controlled operation cycles when actuated for instance by inserting a coin or a token in a coin mechanism 28 which can be of any known or suitable kind, and which forms no part of the actual invention. When inserting a coin or token connection is made for a moment by a contact 28a, and an auxiliary relay 29 is energized when a contact 32d is being kept in normal position. Through its own contact 29a the relay 29 is kept energized even after that the impulse from the contact 28a has ceased.

The relay 29 by its other contact 29b energizes the electromagnetically controlled valves 21 and 27, so that the dispensing valve 7 will be shut, and the measuring receptacle 1 will be connected to vacuum. Since the third contact 29c of the relay 29 is disconnected the electromagnetically controlled valve 17 is shut wherethrough the measuring receptacle 1 is shut off from the ambient atmosphere.

Through the action of the vacuum on the measuring receptacle liquid will be drawn into the latter from the container 4 through suction pipe 3. When the liquid in the receptacle has risen to make contact with the depending portion 9 of the lid 8, and provided that an electrically conductive liquid is handled, a current is transmitted through the liquid in the receptacle to an auxiliary relay 31 which is energized and is kept connected over its own contact 31a even after that the liquid level in the receptacle has lowered, and the liquid no longer makes contact with the lid. The second contact 31b of the auxiliary relay 31 simultaneously breaks the current to the electromagnetically controlled valve 21 whereby the connection between the measuring receptacle 1 and the vacuum vessel 22 is cut off. Simultaneously the fourth contact 31d of the relay 31 is connected so that the electromagnetically controlled valve 17 opens and lets through atmosphere pressure to the measuring receptacle which hitherto was subjected to vacuum. As a result a quantity of liquid corresponding to the volume of the measuring receptacle between the upper end of suction pipe 3 and the level to which the liquid had risen when cutting off the vacuum connection, will flow back down into container 4 through suction pipe 3.

The third contact 31c belonging to the auxiliary relay 31 simultaneously as the other contacts have been actuated has started a time relay 32 which after a certain length of time which can be determined in advance will break the current circuits of the two auxiliary relays 29 and 31 by its contacts 32a and 32b. The time relay is set to act after a time interval which is sufficiently great to enable all of the liquid above the level of the mouth of suction pipe 3 in the measuring receptacle 1 to flow back into the container 4, and the liquid level in the measuring receptacle will then be flush with the top end of suction pipe 3. When the current circuits of the auxiliary relays 29 and 31 are broken the dispensing valve 7 is opened, and all of the several devices are restored to the normal or rest condition, and the measuring and dispensing apparatus now is prepared for a repeated operation cycle.

For the diverse electrical equipment a step-down transformer 30 is provided which transforms the network voltage to a suitably lower voltage such as for instance 24 volts. All cables are connected to a common panel 40 for facilitating testing and checking.

The devices having been now described make it possible to measure and dispense liquids in an automatic way, and in the form outlined above the arrangement is very suitable for dispensing, for example milk. The liquid is agitated without the need for any special devices through the alternating action of ambient air and vacuum on the container 4, and all parts which come into contact with the liquid can be made easily detachable, and can readily be cleaned which is of a great practical importance when handling milk.

Many liquids are, however, electrically non-conductive, and the arrangement described cannot be used for measuring and dispensing such non-conductive liquids without modification. Whereas such modification can be made in many ways, such as arranging a float member in the measuring receptacle which will effect the closing of the control circuit when the liquid reaches a predetermined level, or, especially when coloured or opaque liquids are being handled, by manufacturing the measuring receptacle, or at least appropriate portions thereof of a transparent material, and providing a photo-electric cell unit for sensing the liquid level, it has been found more advantageous to adopt a modification such as will be now described with special reference to Fig. 3.

Figure 3:
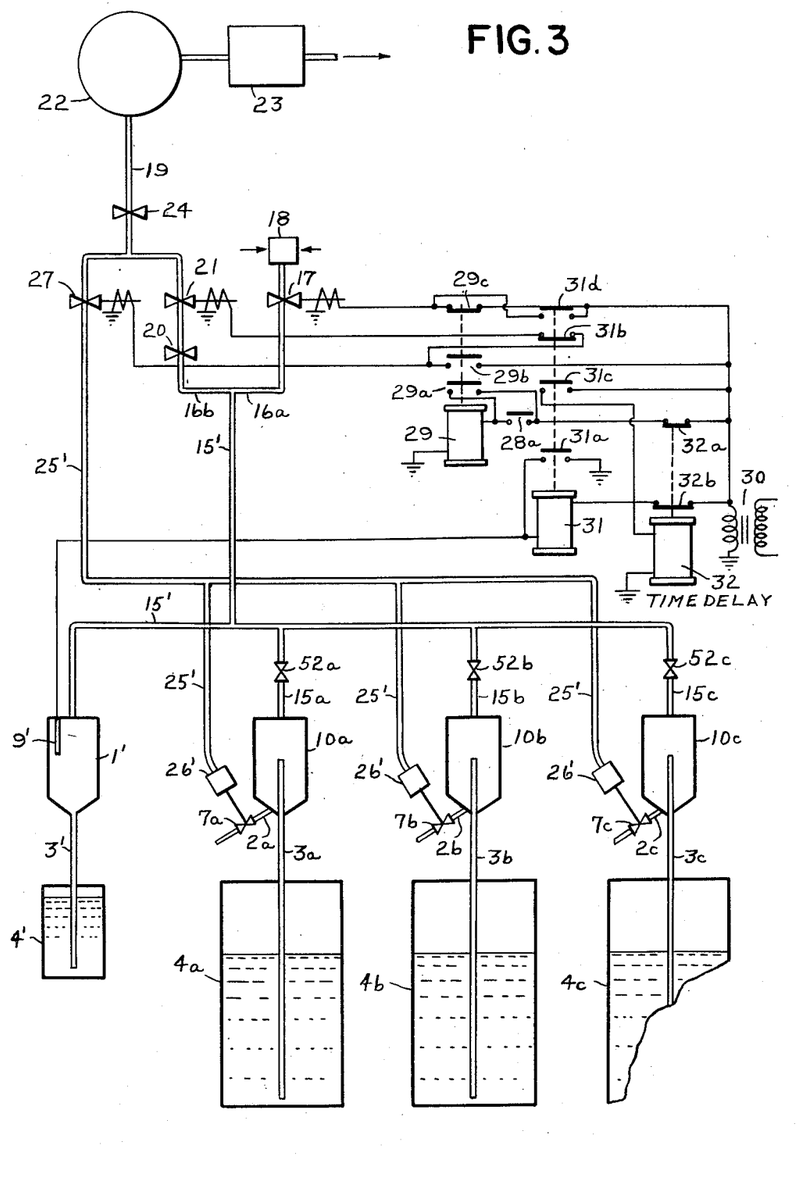
Fig. 3 is a diagrammatic sectional view of an arrangement comprising several measuring receptacles each one connected to a supply container through a suction pipe.

The arrangement diagrammatically illustrated in Fig. 3 may be controlled in substantially the same manner as the one described in conjunction with Fig. 1, and may be identical with the latter as far as the control circuits are concerned. In the arrangement illustrated in Fig. 3, however, the measuring receptacle is modified into a servo vessel 1' which takes no part in the actual measuring and dispensing action, but only serves as a governing unit for one or more measuring receptacles 10a, 10b, 10c . . ., of which three are illustrated in the drawing.

From the bottom of servo vessel 1' a conduit 3' extends downwardly into a container 4' which holds a suitable quantity of an electrically conductive liquid. An electrode 9' projects downwardly from the lid or top of vessel 1', and an air conduit 15' is connected with this same lid or top. If, as shown, an electromagnetical control system such as described in conjunction with Fig. 1 is provided and operated liquid from container 4' will be drawn into the servo vessel 1' until it reaches the electrode 9' wherethrough a circuit will be closed and the appropriate valves will be operated so that the liquid will eventually flow back into container 4'. Now the measuring receptacles 10a, 10b . . . are connected to the same source of vacuum 22 and to ambient air 18 as the servo vessel 1' by the air conduit 15', having branch conduits 15a, 15b . . . which are connected to the tops of the closed vessels 10a, 10b. . . . In branch conduits 15a, 15b . . . manually controlled choke valves 52a, 52b . . . are provided.

From each measuring receptacle 10a, 10b . . . a suction pipe 3a, 3b . . . extends down into a container 4a, 4b . . ., each container holding a quantity of liquid. The suction pipes are extended up to a certain level into the respective measuring receptacles, and the level of their upper ends is adjusted in such a way that the liquid in the receptacle below that level is of the appropriate volume which shall be dispensed. The suction pipes 3a, 3b . . . serve to let back the excess liquid into the containers 4a, 4b. . . . The receptacles 10a, 10b . . . may have different capacities, and/or the level of the top ends of pipes 3a, 3b . . . may differ, and, of course, different kinds of liquids may be held in the respective containers 4a, 4b. . . .

On each receptacle 10a, 10b . . . an outlet 2a, 2b . . . with a shut-off dispensing valve 7a, 7b . . . is provided. At the same time as the servo vessel 1' draws liquid from container 4 the respective measuring receptacles 10a, 10b . . . suck liquid from their containers 4a, 4b. . . . The same operating cycle as the one described in conjunction with Fig. 1 is subsequently performed. That is to say, each of the dispensing valves 7a, 7b and 7c, as shown in Fig. 3, is actuated by a pneumatically operated control unit 26' connected via an air pipe 25' which extends from the valve 27 in Fig. 1 in the same manner as conduit 25. With such an arrangement, it is obvious that there is no discharge valve for vessel 1' since it merely serves a servo i. e. a measuring and not a dispensing function.

If the liquid quantities dispensed from the respective measuring receptacles 10a, 10b . . . have very different volumes between them the choke valves 52a, 52b . . . may be adjusted in such a manner that the respective receptacles are filled to the appropriate degree substantially simultaneously. This may be useful when an arrangement such as being described is used for measuring out the ingredients of a liquid mixture, in chemical work etc.

It is evident that the arrangement illustrated in Fig. 3 will function independently of the electric conductivity of the liquid or liquids being measured and dispensed, provided only that the liquid used in the servo vessel 1 is electrically conductive. If highly inflammable liquids such as petrol shall be handled, it is easy to dispose the servo vessel and the electrical equipment appertaining thereto at one side of a fire-proof wall and the measuring unit or units at the other side thereof. The electromagnetically controlled dispensing valves 7a, 7b . . . may in such case operate the servo means controlling the actual movements of the valves from the servo vessel side of such a wall.

Other devices for controlling the operating cycle than relays and electromagnetically controlled valves may, however, be provided, especially in such cases where the operational sequence and the lengths of time during which the diverse connections are held open and closed may be definitely decided in advance or when designing the actual apparatus. In such case a mechanically operated control valve device can be substituted for the electrical circuit and its appertaining devices, and in Figs. 4–8 the operating schedule of such a mechanical valve device is diagrammatically illustrated.

It should be noted, however, that the diagrammatical representation in Figs. 4–8 also applies to the already described forms of control valve arrangements, and may serve as an aid to clarify the operation cycles of the general kind being features of this invention.

In Figs. 4–8, A, B, C and D respectively designate four valves which can be actuated to permit a free flow therethrough or to completely shut off the flow. It may be assumed that the two valves C, D are used for controlling the connection between a vacuum source and ambient air on one side, and a measuring receptacle or servo vessel such as illustrated in Fig. 1 or 3 on the other side, while the two valves A, B are adapted to control a pneumatical device which actuates the dispensing valve or valves at the measuring receptacles.

Figure 4:
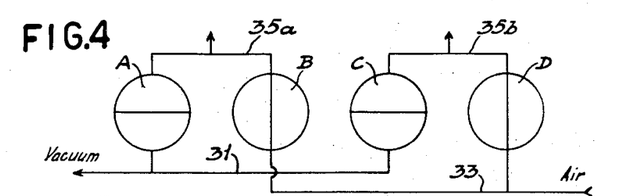
Figs. 4–8 diagrammatically represent the functioning of a valve arrangement.
Figure 5:
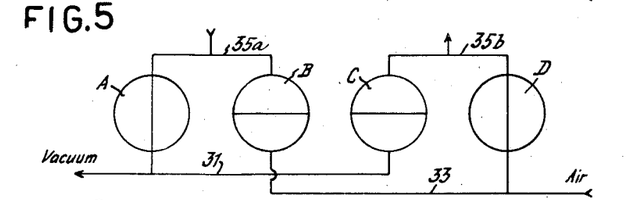
Figure 6:
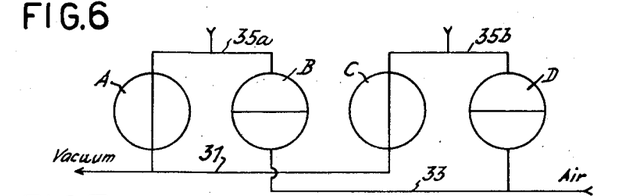
Figure 7:
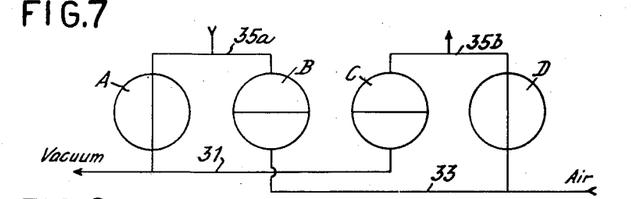
Figure 8:
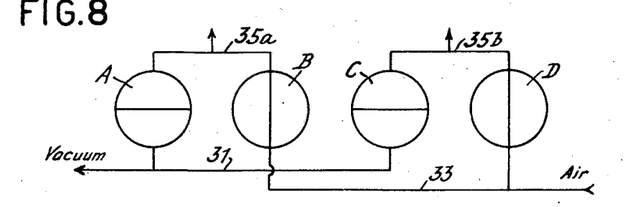

The valves A, C are vacuum valves, and the valves B, D valves for atmospheric pressure. In Fig. 4 valves A, C are shown as shut, i. e. the vacuum source is disconnected from the servo vessel or measuring receptacle or receptacles and from the pneumatic device controlling the dispensing valve or valves, which means that no suction is yet applied to the measuring receptacle or servo vessel, and that the dispensing valve or valves are still in an open position after the preceding operation cycle. If valve A now is made to open (Fig. 5) and valve B, hitherto open, is made to close the controlling device for the dispensing valve or valves is subjected to vacuum, and the ambient air is shut out. The dispensing valve or valves consequently are closed. Thereafter valve C is opened and valve D is closed (Fig. 6). The measuring receptacle or the servo vessel sucks in liquid through being connected to vacuum, the ambient air being shut out. Thereafter the excess liquid is allowed to flow back from the measuring receptacle or receptacles through pipes 3; 3a, 3b . . . to the respective supply container or containers 4; 4a, 4b . . . which is effected by actuating valves C and D (Fig. 7). At last the outlet from the measuring receptacle or receptacles shall be opened. This is caused by opening valve B and closing valve A (Fig. 8), and now the valves have been reset to the positions which they did take up in Fig. 4. The operation cycle may now be repeated.

Figure 9:
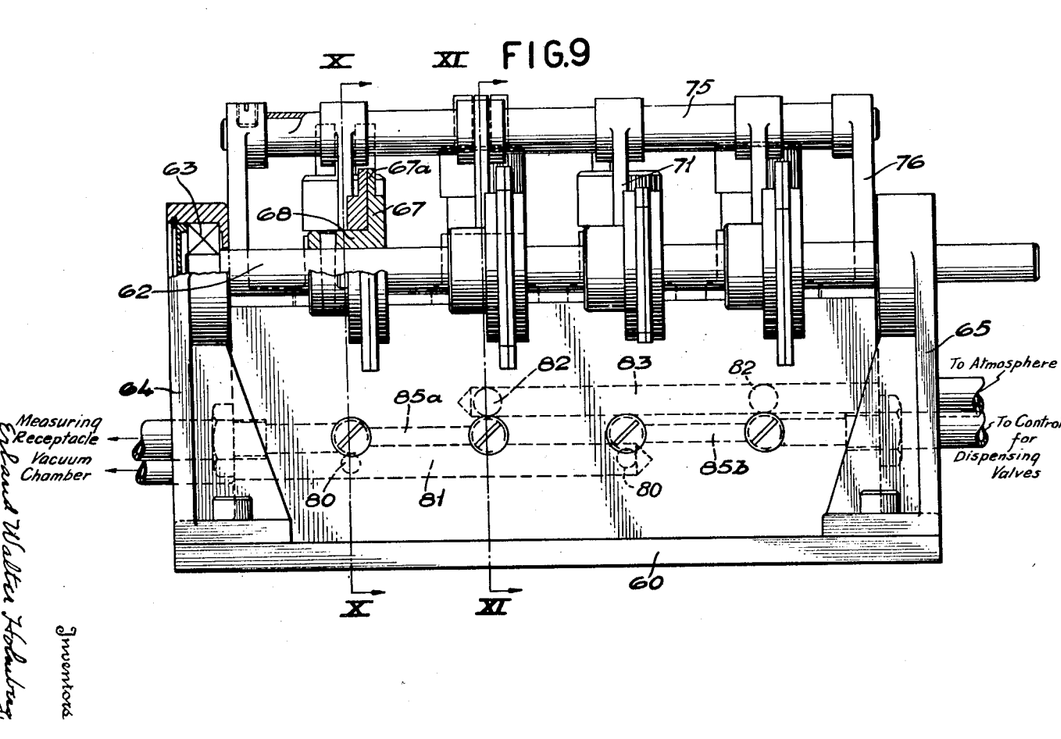
Fig. 9 is an elevational view of a mechanical control valve device.
Figure 10:
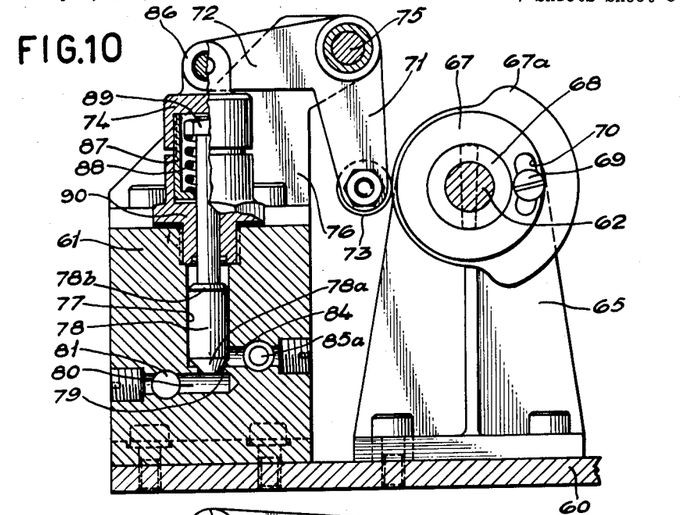
Figs. 10 and 11 are sectional views of the device in Fig. 9 along lines X—X and XI—XI respectively.
Figure 11:
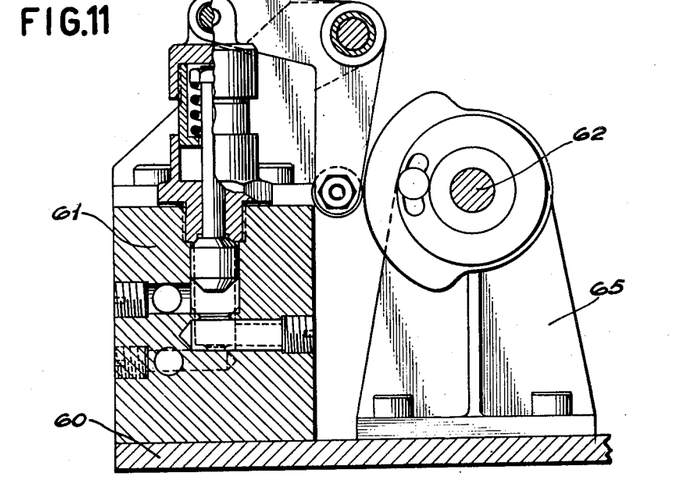

The operations outlined above require some time. If the necessary operational times have been definitely settled the actuation of the valves may be accomplished by means of a mechanically controlled valve device such as is illustrated in Figs. 9–11.

On a base plate 60 a manifold device 61 is disposed, and disposed parallelly to said manifold device a camshaft 62 is arranged for rotation in ball bearings 63 which are disposed in supporting members 64, 65. The camshaft 62 has cam assemblies 67 secured thereto, comprising hub portions 68, and each cam assembly 67 comprises two cam members, one being formed integrally with the hub portion. Each pair of cam members is held together by a bolt 69 which extends through an arcuate slot in one part, and is threaded into the other, and whereby each pair of cam members may be locked in different relative positions.

The outer circumferential portions 67a of the cam members thus may be made somewhat longer or shorter in order to vary the lengths of time during which a valve member is actuated to open or shut.

On rotation of shaft 62 the cam assemblies operate bell cranks, one arm 71 of which bears on the circumference of the corresponding cam 67 by means of a roller 73, while the second arm 72 of the bell crank transmits the motion to a valve tappet device 74. The bell cranks 71—72 are journalled on a shaft 75 secured between bracket means 76 attached to the manifold 61.

In the manifold 61 four vertically extending bores 77 are provided in each of which is disposed a needle valve member 78, and the whole assembly corresponds to valves A, B, C, D diagrammatically illustrated in Figs. 4–8. The bores 77 are formed with valve seats 79, and to every second bore 77 below the valve seat 79 a longitudinal bore 81 is connected by means of transverse bores 80. The bore 81 is connected to a vacuum source such as vacuum vessel 22 in Fig. 1. The remaining two bores 77 are connected by means of transverse bores 82 above the valve seats 79 to a longitudinal bore 83 connected to the atmosphere. Further the first and second bores 77 are interconnected by transverse bores 84 with a longitudinal bore 85a above the valve seat level, and corresponding interconnections are provided between the third and fourth bores 77 which intercommunicate through a longitudinal bore 85b.

The bore 85a is connected to a measuring receptacle or a servo vessel such as illustrated in Figs. 1 and 3, by means of a conduit (not shown), and the bore 85b communicates through another conduit with a control device (not shown) for dispensing valves of the measuring receptacle or receptacles, such as illustrated in Figs. 1 and 3.

The operating cycle of the valve device being just described is easily comprehended with reference to Figs. 4–8.

Each valve tappet device 74 comprises a sleeve member being provided with an eye portion 86 at its top for connecting the sleeve to the corresponding bell crank arm 72. Into said sleeve another sleeve 87 being open at the top, is threaded, there being a bore provided therein for the shank portion of valve member 78. Around said shank portion a compression spring 88 is disposed which abuts with one end the bottom of sleeve 87, and with the opposite end against a shoulder such as a nut 89 on the valve member shank, and said spring tends to raise the tappet device relatively to sleeve 87. The latter is guided by a guide sleeve 90 threaded into the manifold 61, there being provided a bore therein for the shank of valve member 78. The latter at its lower end is shaped with a frusto-conical portion 78a which can engage its valve seat 79, and the valve member further comprises an upper, oppositely facing frusto-conical portion 78b for engagement with a seat in the guide sleeve 90.

When shaft 62 is rotated by any power source such as an electrical motor (not shown) the cam assemblies 67 will actuate the tappet devices 74 over the bell cranks 71—72. When the cam portions 67a engage the rollers 73 the tappets 74 are raised and force the valve members 78 into engagement with their respective seats in the guide sleeves 90. The springs 88 secure a sealing engagement without the need for unduly close tolerances in manufacture and assembly. When the cam portions 67a have passed their respective rollers 73 the valve members are actuated by their weight to drop against the valve seats 79 and close the passage. When shaft 62 rotates the connections illustrated in Figs. 4–8 will be consecutively operated.

By adjustment of the cam assemblies 67 and the rotational speed of shaft 62 the connections illustrated in Figs. 4–8 can be maintained for appropriate lengths of time. A moderate amount of variation of the opening and closing intervals may be effected by adjustment of the respective cam assemblies through loosening bolt 69, turning the two cam members relatively to each other in the appropriate sense, and relocking.

The arrangement described and illustrated makes it possible to control in a simple way an operational sequence actuated by vacuum and atmospheric pressure according to a predetermined schedule, obviating the need to resort to the use of any electrical equipment save a drive motor for camshaft 62.

Figure 12:
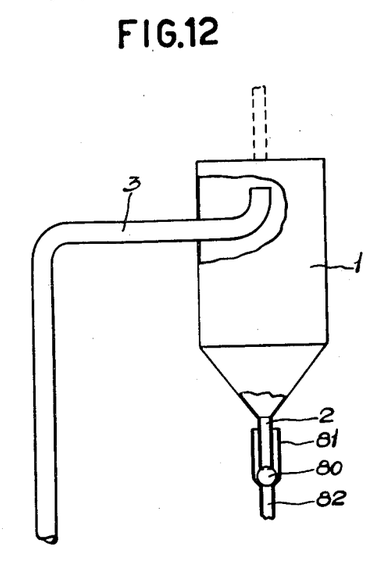
Figs. 12 and 13 are elevational views of alternative embodiments of measuring receptacles.
Figure 13:
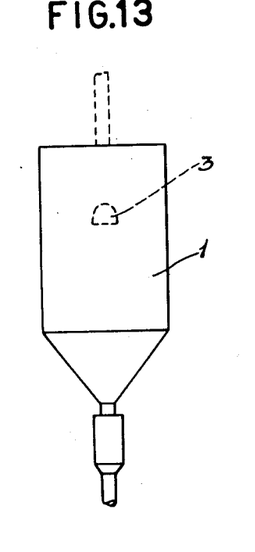

In Figs. 12 and 13 measuring receptacles are illustrated which differ from those shown in Figs. 1 and 3 insofar that the suction pipe is connected to the side wall of the receptacle. In the embodiment shown in Fig. 12 the suction pipe extends horizontally into the receptacle and terminates with a vertical portion, while in the embodiment shown in Fig. 13 the suction pipe ends flush with the receptacle side wall and has a cross section which is shaped like a lying down D having its straight portion facing downwardly. Such measuring receptacles may be used in conjunction with any one of the arrangements described and illustrated in this specification.

The dispensing valve may be of the construction shown in Fig. 12 in which a centrally disposed outlet pipe 2 extends down into a funnel-shaped member 81 having an outlet 82. A ball valve member 80 is normally held tightly against the mouth of pipe 2 by the member 81, 82 the measuring receptacle thus being kept closed. On lowering member 81, 82 liquid can flow out through pipe 2, and a seat provided in the device 81, 82 for the ball valve is preferably shaped in such a manner that the liquid may pass by and out through the outlet 82. This valve unit may be controlled by a servo device which is connected to the vacuum-atmosphere control system.

A modification of a dispensing valve is shown in Fig. 2 which illustrates in greater detail a measuring receptacle serving at the same time as a servo vessel.

At the lower end of the outlet pipe 2 a frusto-conical valve housing 33 is secured. The housing 33 opens downwardly, and inside it a valve member 34 having a bore 35 is provided. The valve member 34 may be turned by means of an extension 36 and by a spring 37 is kept in close contact with the inside wall of the valve housing. The spring force may be adjusted with a butterfly nut 39 bearing against a cup washer 38 serving as an abutment for the spring 37, and the turning of the valve member may be performed through actuating the squared upper end portion 41 of extension 36 by means of a control unit such as 26 in Fig. 1.

If desirable, more than one dispensing valve may be provided for each measuring receptacle, each one valve corresponding to a certain measured quantity of liquid. As shown in Fig. 1a there is provided a second dispensing valve 7a connected to an outlet pipe 2a which projects to a certain level in the measuring receptacle, a quantity which differs from the quantity dispensed through valve 7 thus being dispensed through valve 7a. Appropriate means must of course be provided for selecting which valve shall be used, and separate control units may be provided for controlling the valve operation.

As a modification a further valve may be disposed higher up in outlet pipe 2 whereby a different quantity as compared to the one through valve 7 may be dispensed. Also in such case appropriate selecting means are provided for determining which valve shall be actuated.

Figure 14:
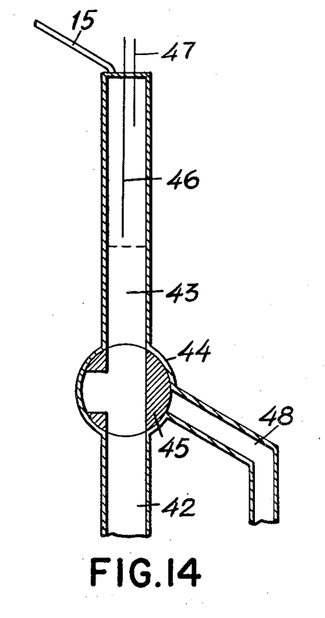
Figs. 14 and 15 are sectional views of a measuring receptacle and suction pipe with a modified shape of a dispensing valve in different positions.
Figure 15:
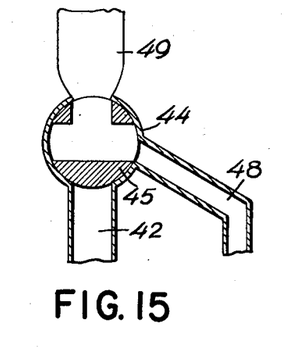

In Figs. 14 and 15 a modified embodiment of a measuring receptacle and suction pipe is illustrated.

The suction pipe 42 is terminated by a valve housing 44 in which a three-way valve member 45 is provided. In the position shown in Fig. 14 valve member 45 opens a passage between a measuring receptacle 43 forming an upper extension of the suction pipe and shuts off an outlet pipe 48. In the insulated top lid of the receptacle electrodes to a desired number may be provided, and those electrodes may depend to different lengths down into the receptacle. Two such electrodes 46 and 47 are shown in Fig. 14. These electrodes may be connected to an electric circuit of the kind described in conjunction with Fig. 1, and a selector device for bringing that electrode into operation which corresponds to the liquid quantity which shall be dispensed may be provided.

When liquid flows upwardly through the suction pipe into the measuring receptacle it eventually reaches the one electrode having been selected, and the circuit is closed, the same operation sequence as having been formerly described being started. The vacuum is disconnected, air is let into the measuring receptacle, and the three-way valve member is turned to the position illustrated in Fig. 15 whereafter the measured liquid is dispensed through the outlet 48.

The three-way valve can be operated by any suitable mechanism such as a rack member being actuated by a ram device operated by vacuum-atmosphere and engaging a pinion disposed at a control shaft secured to the valve member.

The receptacle illustrated in Fig. 14 is very easily cleaned since it essentially only comprises a straight pipe. This pipe can be widened above the valve housing 44 so that a more capacious receptacle 49 is formed as shown in Fig. 15.

Among the many other possible modifications of the arrangements having been described may be mentioned that a common liquid supply container could be provided for a plurality of measuring and dispensing receptacles. Such an arrangement might be of use when a number of like or different quantities of a certain liquid shall be frequently dispensed at a time.

When using a mechanically controlled valve device such as illustrated in Figs. 9–11 the need for a special servo vessel is obviated even if the liquid or liquids being handled are electrically non-conductive. In such a case the servo vessel 1 in Fig. 3 may be transformed into an ordinary measuring and dispensing receptacle such as 10a, 10b . . . .

Having now described our invention, what we claim as new and desire to secure by Letters Patent is:

1. In apparatus for measuring and dispensing liquids the combination of a servo vessel, a container holding a quantity of an electrically conductive liquid, a pipe connection between said servo vessel and said container, a measuring and dispensing receptacle, a liquid supply container for said receptacle, a conduit between said receptacle and said liquid supply container, said conduit extending to a certain level within said receptacle, a vacuum chamber, conduit means connected to said servo vessel and said receptacle, electro-magnetically controlled valve means for connecting said conduit means to said vacuum chamber or, alternatively, to atmosphere, an outlet for said receptacle below the upper end of the conduit therein, a discharge valve in said outlet, an operator for said discharge valve, and an electrical network including said electromagnetically controlled valve means, said servo vessel having an electrically insulated top and electrode means depending therefrom for contact with the electrically conductive liquid to constitute elements of said electrical network.

2. In apparatus for measuring and dispensing liquids the combination of a servo vessel, a container holding a quantity of an electrically conductive liquid, a pipe connection between said servo vessel and said container, a plurality of measuring and dispensing receptacles, a liquid supply container for each measuring receptacle, a conduit between each measuring and dispensing receptacle and the corresponding liquid supply container, said conduit extending to a certain level within each of said receptacles, a vacuum chamber, conduit means connected to said servo vessel and said measuring receptacles, electromagnetically controlled valve means for connecting said conduit means to said vacuum chamber or, alternatively, to atmosphere, an outlet for each receptacle below the upper end of the conduit therein, a discharge valve in each said outlet, an operator for each discharge valve, and an electrical network including said electromagnetically controlled valve means, said servo vessel having an electrically insulated top and electrode means depending therefrom for contact with the electrically conductive liquid to constitute elements of said electrical network.

3. In apparatus for measuring and dispensing liquids, the invention as recited in claim 2, in combination with choke valve means between the respective measuring receptacles and said conduit means; said choke valve means being adjustable to regulate the relative rates of filling of the several measuring receptacles.

4. In apparatus for measuring and dispensing liquids, the combination with a liquid supply container, a receptacle positioned at a higher level than said container, a conduit having a lower end below the liquid level in said container and an upper end at a preselected level within said receptacle, a passage opening out of said receptacle below the upper end of said conduit, a discharge valve in said passage, means to open said discharge valve, of a vacuum chamber, an air conduit opening into said receptacle and having other openings to atmosphere and to said vacuum chamber respectively, valve means in said other openings of said air conduit and between said vacuum chamber and said opening means for said discharge valve, and cycling means for operating said valve means through a cycle comprising opening said air conduit first to said vacuum chamber and then to atmosphere, and then to energize said means for opening said discharge valve.

5. In apparatus for measuring and dispensing liquids, the invention as recited in claim 4, wherein said valve means are electromagnetically actuated valves.

6. In apparatus for measuring and dispensing liquids, the invention as recited in claim 4, wherein said valve means comprises an assembly of a plurality of valves slidable in a valve block to establish connections selectively between four passages therein, one of said passages constituting said air conduit connected to said receptacle, one passage being connected to said vacuum chamber and another opening to atmosphere, the fourth passage extending to said opening means for said discharge valve, and cam means for cyclically operating the several valves.

7. In apparatus for measuring and dispensing liquids, the invention as recited in claim 4, wherein said means for opening said discharge valve is a pneumatic operator biased to open said discharge valve and operative to close the same when subjected to sub-atmospheric pressure, and said cycling means connects said vacuum chamber to said pneumatic operator to energize the same.

References Cited in the file of this patent
UNITED STATES PATENTS

| | | |
|---|---|---|
| 1,925,120 | Tamminga | Sept. 5, 1933 |
| 2,081,650 | Tamminga et al. | May 25, 1937 |
| 2,397,512 | Schwartz et al. | Apr. 2, 1946 |